US008732846B2

(12) United States Patent
D'Angelo et al.

(10) Patent No.: US 8,732,846 B2
(45) Date of Patent: May 20, 2014

(54) PLATFORM FOR PROVIDING A SOCIAL CONTEXT TO SOFTWARE APPLICATIONS

(75) Inventors: Adam D'Angelo, Mountain View, CA (US); Dave Fetterman, San Francisco, CA (US); Charles Duplain Cheever, Palo Alto, CA (US); Arieh Steinberg, Seattle, WA (US); Eric Zamore, Palo Alto, CA (US); James H. Wang, San Francisco, CA (US); Julie Zhuo, Palo Alto, CA (US); David Brookes Morin, San Francisco, CA (US); Mark Slee, San Francisco, CA (US); Ruchi Sanghvi, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 686 days.

(21) Appl. No.: 11/893,559

(22) Filed: Aug. 15, 2007

(65) Prior Publication Data
US 2009/0049525 A1    Feb. 19, 2009

(51) Int. Cl.
  *G06F 7/04*     (2006.01)
  *G06F 17/30*    (2006.01)
  *H04N 7/16*     (2011.01)

(52) U.S. Cl.
  USPC .......................................................... 726/27

(58) Field of Classification Search
  USPC .......................................................... 726/27
  See application file for complete search history.

(56) References Cited

U.S. PATENT DOCUMENTS

| | | | |
|---|---|---|---|
| 5,796,967 A | 8/1998 | Filepp et al. | |
| 5,937,413 A | 8/1999 | Hyun | |
| 5,987,440 A | 11/1999 | O'Neil et al. | |
| 6,029,141 A * | 2/2000 | Bezos et al. | 705/27 |
| 7,013,292 B1 | 3/2006 | Hsu | |
| 7,076,458 B2 * | 7/2006 | Lawlor et al. | 705/35 |
| 7,076,504 B1 * | 7/2006 | Handel et al. | 705/14.39 |
| 7,249,123 B2 | 7/2007 | Elder | |
| 7,269,590 B2 | 9/2007 | Hull | |
| 7,272,603 B2 * | 9/2007 | Fujita et al. | 707/788 |

(Continued)

FOREIGN PATENT DOCUMENTS

| | | |
|---|---|---|
| JP | 2002-7456 A | 1/2002 |
| JP | 2003-331045 A | 11/2003 |

(Continued)

OTHER PUBLICATIONS

Jones (Jones et al., "Facebook: Threats to Privacy", Dec. 2005 found at http://groups.csail.mit.edu/mac/classes/6.805/student-papers/fall05-papers/facebook.pdf).*

(Continued)

*Primary Examiner* — Venkat Perungavoor
*Assistant Examiner* — Khang Do
(74) *Attorney, Agent, or Firm* — Fenwick & West LLP

(57) ABSTRACT

The present invention provides a system and method for providing a social context to software applications. According to one embodiment of the invention, a user of a social network authorizes access by an external software application to information available in the social network. At some time later, the user of the social network uses an application designed by a third-party software developer. The application contacts the social network provider for permission to access the information available in the social network. If access has been authorized, the application incorporates the information from the social network into its interaction with the user, providing a social context to the user's interaction with the application.

12 Claims, 5 Drawing Sheets

(56) References Cited

U.S. PATENT DOCUMENTS

| | | | |
|---|---|---|---|
| 7,369,862 B2* | 5/2008 | Kim et al. | 455/456.3 |
| 7,610,287 B1* | 10/2009 | Dean et al. | 1/1 |
| 7,685,236 B1* | 3/2010 | Harik et al. | 709/205 |
| 7,802,290 B1 | 9/2010 | Bansal et al. | |
| 2001/0037721 A1 | 11/2001 | Hasegawa et al. | |
| 2002/0059201 A1* | 5/2002 | Work | 707/3 |
| 2003/0145093 A1 | 7/2003 | Oren | |
| 2003/0222918 A1 | 12/2003 | Coulthard | |
| 2003/0225632 A1* | 12/2003 | Tong et al. | 705/27 |
| 2003/0233542 A1 | 12/2003 | Benaloh | |
| 2004/0019807 A1* | 1/2004 | Freund | 713/201 |
| 2004/0024846 A1 | 2/2004 | Randall | |
| 2004/0078591 A1* | 4/2004 | Teixeira et al. | 713/201 |
| 2004/0088177 A1 | 5/2004 | Travis | |
| 2004/0148275 A1 | 7/2004 | Achlioptas | |
| 2004/0172455 A1* | 9/2004 | Green et al. | 709/207 |
| 2005/0021750 A1 | 1/2005 | Abrams | |
| 2005/0060417 A1* | 3/2005 | Rose | 709/228 |
| 2005/0096048 A1* | 5/2005 | Clare et al. | 455/433 |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0210395 A1* | 9/2005 | Wakita et al. | 715/753 |
| 2005/0216300 A1 | 9/2005 | Appelman | |
| 2005/0216550 A1 | 9/2005 | Paseman | |
| 2005/0234781 A1* | 10/2005 | Morgenstern et al. | 705/26 |
| 2005/0235062 A1 | 10/2005 | Lunt | |
| 2005/0256756 A1 | 11/2005 | Lam | |
| 2006/0004789 A1 | 1/2006 | Lunt et al. | |
| 2006/0021009 A1* | 1/2006 | Lunt | 726/4 |
| 2006/0041543 A1 | 2/2006 | Achlioptas | |
| 2006/0042483 A1 | 3/2006 | Work | |
| 2006/0048059 A1 | 3/2006 | Etkin | |
| 2006/0052091 A1 | 3/2006 | Onyon | |
| 2006/0068767 A1* | 3/2006 | Bhakta et al. | 455/418 |
| 2006/0074863 A1* | 4/2006 | Kishore et al. | 707/3 |
| 2006/0080613 A1 | 4/2006 | Savant | |
| 2006/0085419 A1 | 4/2006 | Rosen | |
| 2006/0136419 A1 | 6/2006 | Brydon | |
| 2006/0143068 A1 | 6/2006 | Calabria | |
| 2006/0143183 A1 | 6/2006 | Goldberg | |
| 2006/0149740 A1* | 7/2006 | Tsutazawa et al. | 707/9 |
| 2006/0161599 A1 | 7/2006 | Rosen | |
| 2006/0184617 A1 | 8/2006 | Nicholas | |
| 2006/0190281 A1 | 8/2006 | Kott | |
| 2006/0194186 A1 | 8/2006 | Nanda | |
| 2006/0215690 A1* | 9/2006 | Wilson et al. | 370/465 |
| 2006/0218225 A1 | 9/2006 | Hee Voon | |
| 2006/0229063 A1 | 10/2006 | Koch | |
| 2006/0230061 A1 | 10/2006 | Sample | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0288401 A1* | 12/2006 | Wilson | 726/1 |
| 2006/0293976 A1 | 12/2006 | Nam | |
| 2007/0021111 A1* | 1/2007 | Celik | 455/418 |
| 2007/0174389 A1 | 7/2007 | Armstrong | |
| 2007/0191058 A1* | 8/2007 | Vanska et al. | 455/558 |
| 2007/0208916 A1 | 9/2007 | Tomita | |
| 2007/0266118 A1* | 11/2007 | Wilkins | 709/219 |
| 2007/0282959 A1* | 12/2007 | Stern | 709/206 |
| 2007/0282987 A1 | 12/2007 | Fischer | |
| 2008/0005076 A1 | 1/2008 | Payne | |
| 2008/0010343 A1 | 1/2008 | Escaffi | |
| 2008/0033776 A1 | 2/2008 | Marchese | |
| 2008/0040428 A1 | 2/2008 | Wei | |
| 2008/0070697 A1 | 3/2008 | Robinson | |
| 2008/0086458 A1 | 4/2008 | Robinson | |
| 2008/0137859 A1* | 6/2008 | Jagadeesan et al. | 380/270 |
| 2008/0209482 A1* | 8/2008 | Meek et al. | 725/105 |
| 2009/0076912 A1* | 3/2009 | Rajan et al. | 705/14 |
| 2009/0221307 A1* | 9/2009 | Wolak et al. | 455/466 |
| 2010/0030734 A1 | 2/2010 | Chunilal | |
| 2010/0094878 A1 | 4/2010 | Soroca et al. | |

FOREIGN PATENT DOCUMENTS

| | | |
|---|---|---|
| WO | WO 2006/019752 | 2/2006 |
| WO | WO 2006/050278 | 5/2006 |
| WO | WO 2007/052285 | 5/2007 |
| WO | WO 2007/070676 | 6/2007 |
| WO | WO 2007/142063 | 12/2007 |

OTHER PUBLICATIONS

XBOX (the electronic reference dated Jul. 2006, found on http://forums.xobx-scene.com/index.php?showtopic=532027).*

ChipIn ("Social Networking to ChipIn to a Good Cause" electronic reference, Jun. 2006, found at http://www.businessdesignstudio.com/resources/blogger/2006/06/social-networking-to-chipin-to-good.html).*

XuQa ("Trending Stories", Aug. 2006, found at http://mashable.com/2006/08/15/xuqa-combines-social-networking-with-games).*

Flores, Fernando et al. "Computer systems and the design of organizational interaction." In ACM Transactions on Information Systems (TOIS), vol. 6, Issue 2, Apr. 1988.

ChipIn. ChipIn: The easy way to collect money [online], Dec. 15, 2006 http://web.archive.org/web/20061215090739/www.chipin.com/overview.

Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.

PCT International Search Report and Written Opinion, PCT/US2008/073202, Nov. 10, 2008, 8 Pages.

State Intellectual Property Office of the People's Republic of China, First Office Action, Application No. 2008-80103393.1, Sep. 13, 2011, nine pages.

Australian Government, IP Australia, Patent Examination Report No. 2, Patent Application No. 2008261648, Dec. 17, 2012, three pages.

State Intellectual Property Office of the People's Republic of China, Chinese Patent Application No. 2008-80103393.1, Feb. 1, 2013, eleven pages.

State Intellectual Property Office of the People's Republic of China, PRC Application No. 2008-80019930.4, Feb. 28, 2012, twelve pages.

Australian Patent Office, Examiner's First Report, Australian Patent Application No. 2008-286781, May 28, 2012, two pages.

Chinese State Intellectual Property Office of the People's Republic of China, Chinese Patent Application No. 2008-80103393.1, Jun. 5, 2012, ten pages.

Australian Government, IP Australia, Patent Examination Report No. 3, Patent Application No. 2008261648, May 16, 2013, three pages.

Canadian Intellectual Property Office, Office Action, Canadian Patent Application No. 2,695,545, May 3, 2013, seven pages.

Japanese Patent Office, Office Action, Japanese Patent Application No. 2010-521182, May 14, 2013, ten pages.

European Patent Office Communication, European Patent Office Application No. 08770901.0, Jul. 19, 2011, one page.

PCT International Search Report and Written Opinion, PCT Application No. PCT/US2008/066787, Oct. 22, 2008, six pages.

State Intellectual Property Office of the People's Republic of China, First Office Action, Application No. 2008-80019930.4, Mar. 9, 2011, eleven pages.

Japanese Patent Office, Notice of Grounds for Rejection, Japanese Patent Application No. P2010-512362, Jul. 17, 2012, 4 pages.

(56) References Cited

OTHER PUBLICATIONS

Australian Patent Office, Examiner's First Report, Australian Patent Application No. 2008261648, Jan. 23, 2012, two pages.
United States Office Action, U.S. Appl. No. 12/138,212, Mar. 22, 2011, fifteen pages.
European Patent Office, Extended European Search Report, European Patent Application No. 08797914.2, Dec. 14, 2011, five pages.
State Intellectual Property Office of the People's Republic of China, Fourth Office Action, Chinese Patent Application No. 200880103393.1, Jul. 31, 2013, twelve pages.
State Intellectual Property Office of the People's Republic of China, Office Action, Chinese Patent Application No. 200880103393.1, Jan. 17, 2014, sixteen pages.
Japanese Patent Office, Office Action, Japanese Patent Application No. 2010-521182, Feb. 18, 2014, eight pages.

* cited by examiner

PLATFORM FOR PROVIDING A SOCIAL CONTEXT TO SOFTWARE APPLICATIONS

CROSS-REFERENCE TO RELATED APPLICATIONS

This application is related to U.S. patent application Ser. No. 11/493,291, titled "Systems and Methods for Dynamically Generating a Privacy Summary," filed on Jul. 25, 2006, and U.S. Provisional Patent Application Ser. No. 60/906,961, titled "Systems and Methods for Network Authentication," filed on Mar. 13, 2007. The disclosures of both of the above U.S. patent applications are incorporated by reference herein.

BACKGROUND OF THE INVENTION

1. Field of the Invention

This invention relates to internet applications, and particularly to using an internet-based social network to provide a social context to a user's interaction with a third-party software application.

2. Description of Related Art

Providers of internet-based social networks currently allow third-party software developers to develop applications that can interact with the social network. However, the social networks provide only limited information, and do not offer a social context to the application. That is, a user of the third-party application does not see what other users of the social network are doing, or access information about other users of the social network that is not publicly available information.

There is no currently available platform that a third-party developer of a software application may use to develop an application that draws a social context from information available in the social network.

SUMMARY OF THE INVENTION

The present invention provides a system and method for providing a social context to software applications. According to one embodiment of the invention, a user of a social network may authorize access by an external software application to information available in the social network. When the user of the social network uses the external application, the application contacts the social network provider for permission to access the information available in the social network. If access has been authorized, the application incorporates the information from the social network into its interaction with the user, providing a social context to the user's interaction with the application.

DETAILED DESCRIPTION OF THE INVENTION

The present invention provides a platform for using a social network to provide a social context to a software application that is external to the social network, such as an application developed by a third-party developer rather than the social network provider and/or which does not reside within the social network or social network provider. A social context comprises information that personalizes the interaction of a user with the software application.

A social network provider may offer access to a platform according to the present invention to a third-party developer of a software application, so that the developer may design an application that draws a social context from the social network. Such an application may then incorporate privacy-controlled information about users of the social network, allowing the user of the application to experience the social context provided by the social network provider.

For example, a user of a social network may also wish to use a third-party software application that displays book reviews. If the user has authorized the social network provider to provide information associated with the user in the social network to an external application, then the user may access that information through the book review application. For example, the user may use the application to find book reviews on that application created by people with whom he has established connections in the social network. If the social network normally collects its own data on books, location, or any other set of its own data accessible through the provided application programming interface, the user may incorporate that data into his use of the third party application as well.

Figure 1:
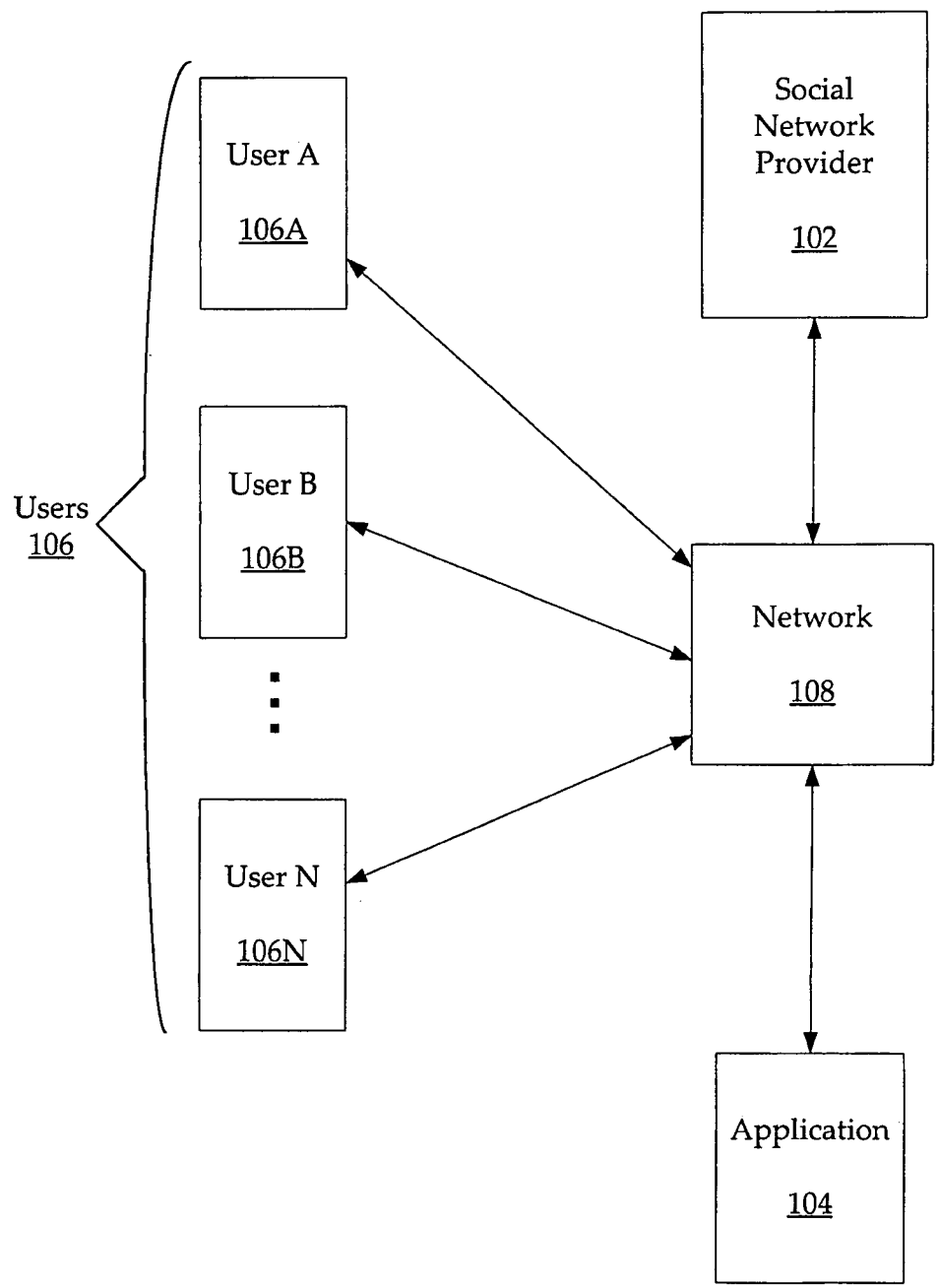
FIG. 1 is a block diagram of an architecture connecting a social network provider, a software application, and users of computing devices over a network that may be used with the present invention.

FIG. 1 is a block diagram of an architecture connecting a social network provider 102, a software application 104, and users 106 via computing devices over a network 108 that may be used with the present invention. Users 106, such as a user 106A, a user 106B, and a user 106N, communicate over a network 108 with a social network provider 102. The users 106A-106N may use any type of communication device compatible with the social network provider 102, such as a cellular telephone, a personal digital assistant, and/or a desktop or a laptop computer. Any type of communication device falls within the scope of various embodiments.

The social network provider 102 may comprise any user or entity that provides social networking services, for example, communication services, dating services, or other services for social interaction. For example, the social network provider 102 may host a website that allows one or more users 106 to communicate with one another via the website. In one instance, the user 106A may communicate with the user 106B via a social networking website associated with the social network provider 102 that offers the user an opportunity to connect or reconnect with one or more other users 106B-106N who attended, for example, the same university as the user 106A.

According to some embodiments, a developer of an application 104 may contact the social network provider 102 and request an application key from the developer. The social network provider 102 may review the developer's proposed application 104 and approve interaction between the application 104 and the social network. Review and approval may take any desired form; for example, they may require review by a person or they may be automatic.

The application 104 may be any type of application, so that, for example, those that display still or moving images, those that play sounds such as music or speech, those for financial management, for calendaring, or for any purpose are within the scope of the invention. The application 104 may be written in any natural and/or computer language or languages.

When a user 106A encounters the application 104 and uses it in a way that requests access to information from the social network provider 102, the social network provider 102 checks to see whether the user of the application has provided authorization for access to the information by the application 104.

In some embodiments, a user of a social network may authorize external use of information available in the social network over which he has control. For example, the information may be associated with his user profile, account, userid (a piece of unique user identification), or any other data or data structure representing the user. Exemplary authorization methods include, but are not limited to, those in which: (1) the user opens an infinite session with the social network (as described in U.S. Provisional Patent Application Ser. No. 60/906,961, titled "Systems and Methods for Network Authentication," filed on Mar. 13, 2007); and (2) the user logs into the social network and through a checkbox menu or other display selects authorization settings for some or all of his information in the social network. Authorization may occur before or during the user's access to application 104, and may persist indefinitely until altered by the user or by the social network provider 102. Alternatively, for example, the login process of the social network may start a clock that results in the expiration of the authorization after some time period; after expiration, a new authorization would be required. Thus, the user of the application 104 may be, but need not be, actively using the social network (for instance, through a window open on his computer's desktop) while accessing information available in the social network through the application 104.

Information available in the social network for use with the application 104 may be subject to privacy settings selected by the users 106 of the social network (as described in U.S. patent application Ser. No. 11/493,291, titled "Systems and Methods for Dynamically Generating a Privacy Summary," filed on Jul. 25, 2006). The privacy settings selections may be set either as a part of the authorization process described above, or independently. In such a case, the application 104 should be designed to incorporate privacy-controlled information about users 106 of the social network into the interaction of user 106A with the application 104, so that the privacy settings set by the user 106A in the social network are incorporated into the interactions of user 106A or other users with the application 104.

Figure 2:
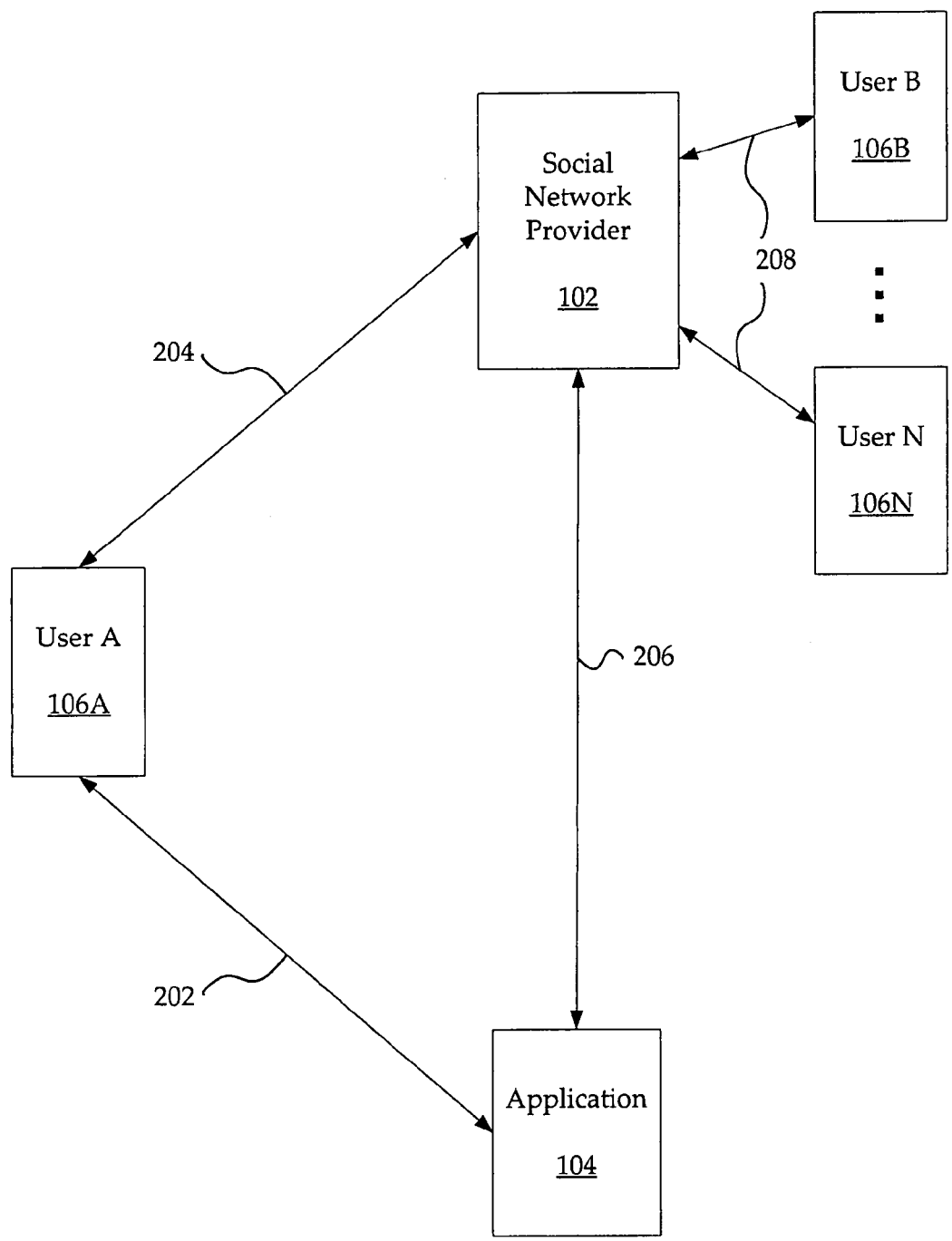
FIG. 2 is a block diagram showing exemplary interactions of a user with a social network provider and with a third-party software application according to the present invention.

FIG. 2 is a block diagram showing exemplary interactions of a user 106A with a social network provider 102 and with a third-party software application 104. The user 106A is having an interaction 202 with the application 104 at the moment depicted. For the social network provider 102 to provide a social context for the application 104 that is personalized to user 106A, interactions 204 and 206 must be occurring and/or must have already occurred at the time of interaction 202.

Figure 3:
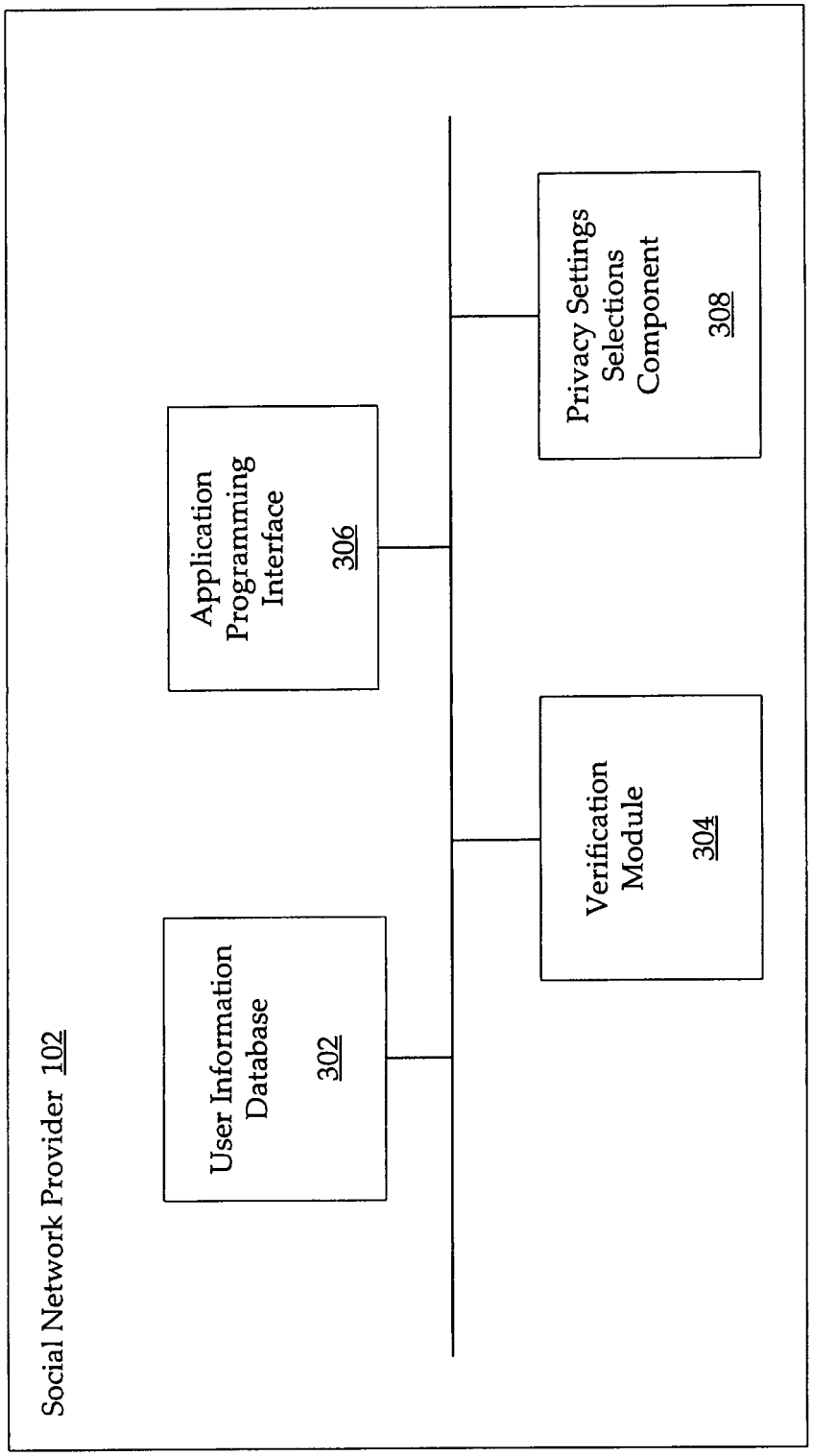
FIG. 3 is a block diagram of an exemplary social network provider offering a platform for providing a social context to a software application.

In an exemplary embodiment, interaction 204 between a user 106A and a social network provider 102 comprises the authorization process described above, in which user 106A authorizes the access of information about user 106A by the application 104. Interaction 204 may optionally also comprise the selection of privacy settings by user 106A. Interaction 206 comprises one or more instances of access of data in the social network by the application 104. For example, an application 104 that dynamically updates information from the social network will have frequent, multiple interactions 206 with the social network provider 102; such interactions 206 may be mediated or otherwise processed by one or more application processing interfaces as shown in FIG. 3. Interactions 208 comprise authorizations, privacy settings selections, and/or other information provided to the social network provider 102 by one or more users 106B-106N, which similarly control access to their information by the application 104.

FIG. 3 is a block diagram of an exemplary social network provider 102 offering a platform for providing a social context to one or more software applications 104. The social network provider 102 may comprise a server, a client device, or any other device.

The social network provider 102 includes a user information database 302, a verification module 304, and an application programming interface 306, and may optionally also include a privacy settings selections component 308. The user information database 302 stores data associated with each user 106A-106N of the social network, which may be accessible by a third-party application under appropriate conditions. When a user 106A authorizes access to one or more external applications, and/or selects or updates privacy settings associated with his information, the user information database 302 updates the data associated with user 106A. Accordingly, authorizations and privacy settings selections are stored in association with each user 106. Authorizations, privacy settings selections and other user 106 information may be stored, modified, added, or otherwise embodied or captured in any storage medium.

The verification module 304 verifies that the user 106A of an application 104 attempting to access information from the social network has authorized use of that information, as discussed herein.

The application programming interface 306 communicates with the application 104 over the network 108. The application 104 communicates various types of information, such as requests for information about user 106A, requests for information about one or more users 106B-106N, and optionally updates of information about user 106A, to the social network provider 102 through the application programming interface 306. Any type of application programming interface 306 is within the scope of various embodiments.

Optionally, a privacy settings selections component 308 receives privacy settings selections from a user 106, such as user 106A. The privacy settings selections component 308 updates the user information database 302 with the privacy settings selected by the user 106A.

Although the social network provider 102 is described as being comprised of various components (such as the user information database 302, the verification module 304, the application programming interface 306 and the privacy settings selections component 308), fewer or more components may comprise the social network provider 102 and still fall within the scope of various embodiments.

The social network provider 102 may provide any type of social network. That is, a social network may comprise users grouped according to any type of category, such as friends, users living near each other, and fellow alumni. The user may specify the networks and groupings, and/or the networks and groupings may be predetermined by the social network provider 102. Thus, a user 106A may be related to a user 106N in various ways through the social network, for example, by being included with user 106N in a group of users living in the Boston area.

Figure 4:
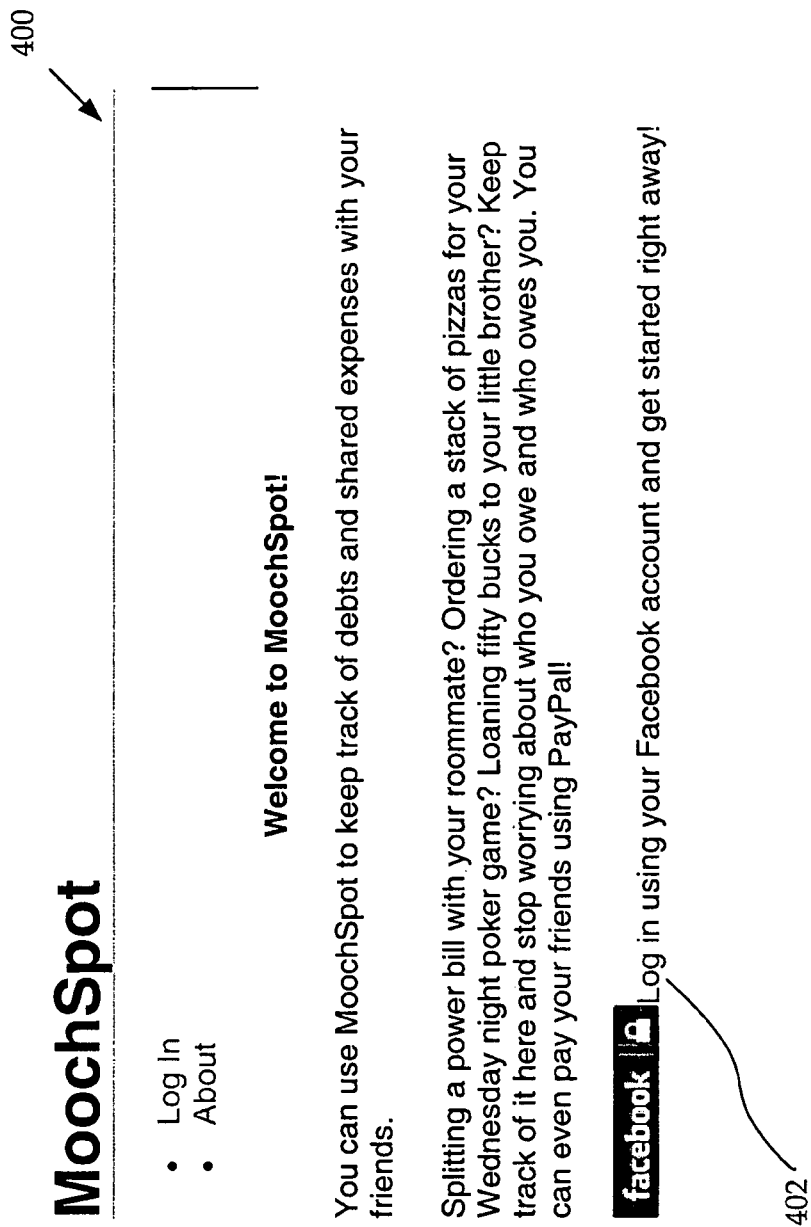
FIG. 4 shows a screenshot of an exemplary external software application having a social context provided by a social network provider according to the present invention.

FIG. 4 shows a screenshot 400 of an exemplary external software application 104 having a social context provided by a social network provider 102 according to the present invention. The application "MoochSpot" allows the user 106A to keep track of loans and debts to users 106B-106N to whom user 106A is related through the group "friends" in the social network. While as illustrated, there is a link 402 that asks the user to log into the social network, in other embodiments the user need not be simultaneously logged into the social network.

Figure 5:
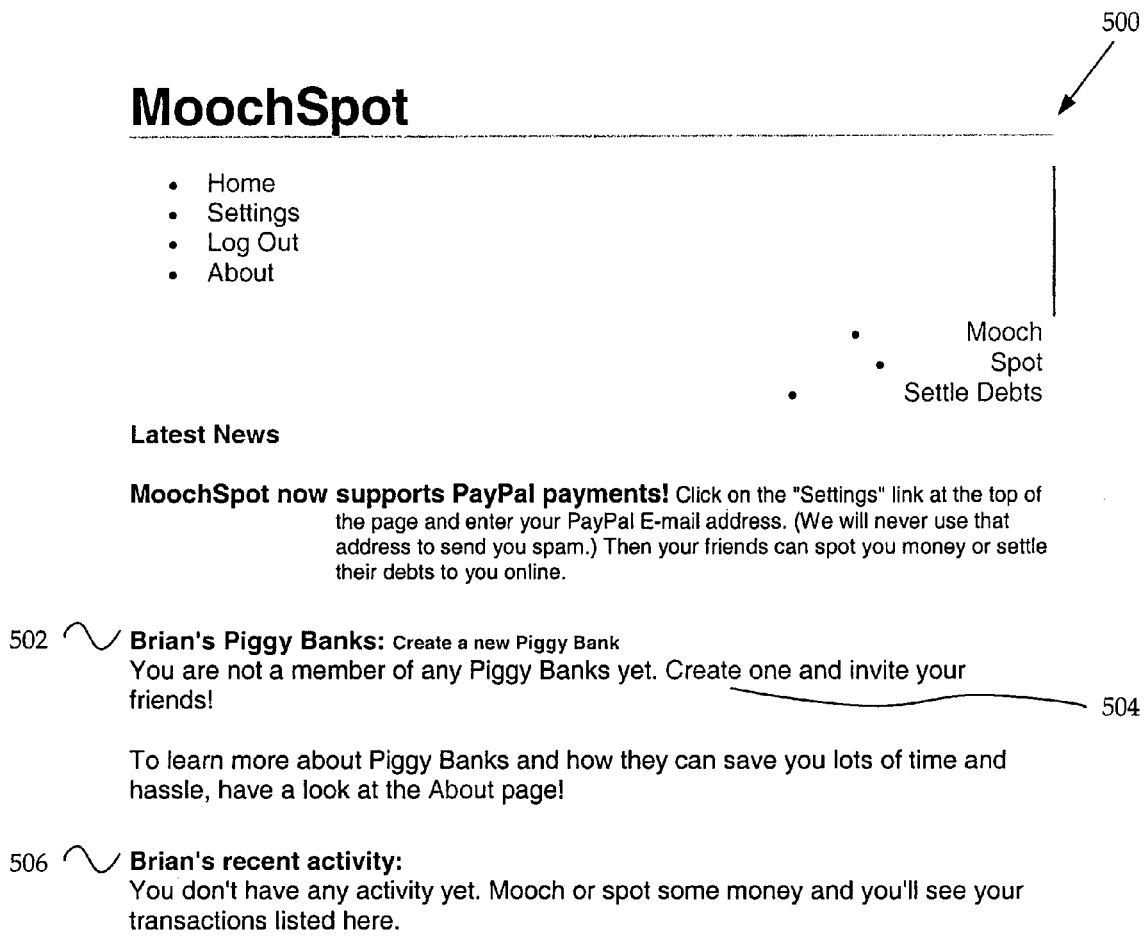
FIG. 5 shows another screenshot of an exemplary external software application having a social context provided by a social network provider according to the present invention.

FIG. 5 shows another screenshot 500 of an exemplary external software application 104 having a social context provided by a social network provider 102 according to the present invention. A portion 502 of the screen allows user 106A to create a "piggy bank" and invite his "friends" from among users 106B-106N to join it. For example, a link 504 invites the user 106A to click and thereby be directed to another display of additional information (not shown); the social context provided to the application 104 for user 106A by the social network provider 102 is updated through the display of additional information about, and the creation of new relationships with, users 106B-106N. A portion 506 of the screen also allows user 106A to view any financial transactions with users 106B-106N through application 104. As these transactions occur, the social context provided to the application 104 will be updated accordingly.

While various embodiments have been described above, it should be understood that they have been presented by way of example only, and not limitation. Thus, the breadth and scope of a preferred embodiment should not be limited by any of the above-described exemplary embodiments.

What is claimed is:

1. A method comprising:
receiving at the social networking system a privacy setting from a user of the social networking system via a user device, the privacy setting indicating whether an application provided by a party other than a provider of the social networking system is authorized to access information about the user, including information about one or more other users with whom the user has established a connection in the social networking system, and wherein the application provides content from a server on which the application is executed to the user device based on the accessed information about the one or more other users with whom the user has established a connection in the social networking system;
receiving additional privacy settings from one or more other users of the social networking system with whom the user has established a connection, the additional privacy settings at least in part defining whether the application can make a particular user's information obtained from the social networking system available through the application to other users of the application;
receiving at the social networking system a request from the application for information about the user of the social networking system, the requested information comprising information about one or more of the other users with whom the user has a connection in the social networking system;
determining, based on the received privacy setting, whether the social networking system is authorized to provide the requested information to the requesting application; and
subject to the determining, providing the requested information from the social networking system to the requesting application.

2. The method of claim 1, wherein the requested information comprises information about the user of the application.

3. The method of claim 1, wherein the requested information comprises information about one or more other users of the social networking system.

4. The method of claim 3, wherein the user has established a connection in the social networking system with the other users.

5. A system comprising:
a processor;
a non-transitory computer readable storage medium for storing software modules;
a user information database configured to store and update information associated with users of a social networking system and authorization for the use of the information;
an application programming interface configured to:
receive a privacy setting from a user of the social networking system via a user device, the privacy setting indicating whether an application provided by a party other than a provider of the social networking system is authorized to access information about the user, including information about one or more other users with whom the user has established a connection in the social networking system, and wherein the application from a server on which the application is executed to the user device based on the accessed information about the one or more other users with whom the user has established a connection in the social networking system,
receive additional privacy settings from one or more other users of the social networking system with whom the user has established a connection, the additional privacy settings at least in part defining whether the application can make a particular user's information obtained from the social networking system available through the application to other users of the application,
receive a request for information about the user stored in the user information database, the requested information comprising information about one or more of the other users with whom the user has a connection in the social networking system, and
a verification module configured to:
determine, based on the received privacy setting, whether the social networking system is authorized to provide the requested information to the requesting application, and
provide the requested information from the social networking system to the application programming interface if authorized.

6. A computer program product comprising a non-transitory computer-readable storage medium containing computer program code for performing the steps:
receiving at the social networking system a privacy setting from a user of the social networking system via a user device, the privacy setting indicating whether an application provided by a party other than a provider of the social networking system is authorized to access information about the user, including information about one or more other users with whom the user has established a connection in the social networking system, and wherein the application provides content from a server on which the application is executed to the user device based on the accessed information about the one or more other users with whom the user has established a connection in the social networking system;

receiving additional privacy settings from one or more other users of the social networking system with whom the user has established a connection, the additional privacy settings at least in part defining whether the application can make a particular user's information obtained from the social networking system available through the application to other users of the application;

receiving at the social networking system a request from the application for information about the user of the social networking system, the requested information comprising information about one or more of the other users with whom the user has a connection in the social networking system;

determining, based on the received privacy setting, whether the social networking system is authorized to provide the requested information to the requesting application;

subject to the determining, providing the requested information from the social networking system to the requesting application.

7. The computer program product of claim 6, wherein the requested information comprises information about the user of the application.

8. The computer program product of claim 6, wherein the requested information comprises information about one or more other users of the social networking system.

9. The computer program product of claim 8, wherein the user has established a connection in the social networking system with the other users.

10. The method of claim 1, further comprising:

receiving privacy settings from the user of the social networking system, the privacy settings at least in part defining whether the application can make the user's information obtained from the social networking system available through the application to other users of the application with whom the user has established a connection in the social networking system.

11. The system of claim 5, wherein the application programming interface is further configured to:

receive privacy settings from the user of the social networking system, the privacy settings at least in part defining whether the application can make the user's information obtained from the social networking system available through the application to other users of the application with whom the user has established a connection in the social networking system.

12. The computer program product of claim 6, the computer-readable storage medium further containing computer program code for:

receiving privacy settings from the user of the social networking system, the privacy settings at least in part defining whether the application can make the user's information obtained from the social networking system available through the application to other users of the application with whom the user has established a connection in the social networking system.

* * * * *